United States Patent
Zhao et al.

(10) Patent No.: US 11,774,614 B2
(45) Date of Patent: Oct. 3, 2023

(54) SYNTHETIC SUBTERRANEAN SOURCE

(71) Applicant: X Development LLC, Mountain View, CA (US)

(72) Inventors: Allen Richard Zhao, Mountain View, CA (US); Kenton Lee Prindle, Austin, TX (US); Kevin Forsythe Smith, Pleasanton, CA (US); Artem Goncharuk, Mountain View, CA (US)

(73) Assignee: X Development LLC, Mountain View, CA (US)

(*) Notice: Subject to any disclaimer, the term of this patent is extended or adjusted under 35 U.S.C. 154(b) by 127 days.

(21) Appl. No.: 17/374,320

(22) Filed: Jul. 13, 2021

(65) Prior Publication Data

US 2023/0020861 A1 Jan. 19, 2023

(51) Int. Cl.
*G01V 1/30* (2006.01)
*G01V 1/18* (2006.01)

(52) U.S. Cl.
CPC ............. *G01V 1/30* (2013.01); *G01V 1/18* (2013.01); *G01V 2210/121* (2013.01); *G01V 2210/1295* (2013.01); *G01V 2210/1425* (2013.01); *G01V 2210/66* (2013.01)

(58) Field of Classification Search
CPC ........ G01V 1/30; G01V 1/18; G01V 2210/66; G01V 1/50; G01V 2210/121; G01V 2210/1295; G01V 2210/1425; G01V 3/001; G01V 1/003
USPC .......................................................... 73/594
See application file for complete search history.

(56) References Cited

U.S. PATENT DOCUMENTS

| 4,013,905 A | * | 3/1977 | Breneman | ............... G01N 29/14 |
| | | | | 310/336 |
| 4,911,012 A | * | 3/1990 | Ziska | .................... G01V 1/001 |
| | | | | 73/584 |
| 5,127,267 A | | 7/1992 | Huebler et al. | |
| 5,412,989 A | | 5/1995 | Eberle et al. | |

(Continued)

FOREIGN PATENT DOCUMENTS

| BR | 112021011250 A2 * | 8/2021 | ............... G01V 1/28 |
| WO | WO-9010866 A1 * | 3/1990 | ............. G01V 1/001 |

OTHER PUBLICATIONS

Muggleton et al., "Vibration Radiation from Buried Plastic Water Pipes: An Experimental Investigation at the Ground Surface", 2012, Proceeding of ISMA2012, 1223-1238 (Year: 2012).*

(Continued)

*Primary Examiner* — Yuqing Xiao
*Assistant Examiner* — Christopher Richard Walker
(74) *Attorney, Agent, or Firm* — Fish & Richardson P.C.

(57) ABSTRACT

This disclosure describes a system and method for generating images and location data of a subsurface object using existing infrastructure as a source. Many infrastructure objects (e.g., pipes, cables, conduits, wells, foundation structures) are constructed of rigid materials and have a known shape and location. Additionally these infrastructure objects can have exposed portions that are above or near the surface and readily accessible. A signal generator can be affixed to the exposed portion of the infrastructure object, which induces acoustic energy, or vibrations in the object. The object with affixed signal generator can then be used as a source in performing a subsurface imaging of subsurface objects, which are not exposed.

35 Claims, 4 Drawing Sheets

(56) References Cited

U.S. PATENT DOCUMENTS

| | | | | |
|---|---|---|---|---|
| 6,055,214 | A * | 4/2000 | Wilk | G01S 15/89 |
| | | | | 89/1.13 |
| 2010/0018312 | A1* | 1/2010 | Kirkpatrick | G01V 1/001 |
| | | | | 73/592 |
| 2018/0275299 | A1 | 9/2018 | Tarkenton | |
| 2019/0128730 | A1* | 5/2019 | Stuart | G01H 3/125 |
| 2020/0400805 | A1* | 12/2020 | Sarabandi | G01S 13/86 |
| 2022/0283329 | A1* | 9/2022 | Zwartjes | G01V 1/345 |

OTHER PUBLICATIONS

Dutta et al. "3D Mapping of Buried Underworld Infrastructure Using Dynamic Bayesian Network Based Multi-Sensory Image Data Fusion", Journal of Applied Geophysics 92 (2013), 8-19 (Year: 2013).*

BR 112021011250 A2 [Machine Translation] (Year: 2021).*

Muggleton et al., "Vibration radiation from buried plastic water pipes: an experimental investigation at the ground surface," Proc. Int. Conf. Noise Vib. Eng. ISMA, pp. 1223-1237.

Alimoradi et al., "Prediction of geological hazardous zones in front of a tunnel face using TSP-203 and artificial neural networks," Tunneling and Underground Space Technology, Nov. 1, 2008, 23(6):711-717.

International Search Report and Written Opinion in International Appln. No. PCT/US2022/036644, dated Oct. 19, 2022, 18 pages.

Klose et al., "Spatial predictions of geological rock mass properties based on in-situ interpretations of multi-dimensional seismic data," Engineering Geology, Aug. 30, 2007, 93(3-4):99-116.

* cited by examiner

SYNTHETIC SUBTERRANEAN SOURCE

TECHNICAL FIELD

This disclosure generally relates to generating subsurface images of subterranean objects using partially subterranean infrastructure as a source device.

BACKGROUND

Subsurface objects can require periodic inspections or other assessments of their physical condition and location. Additionally discovery of new subsurface objects can be a difficult and expensive process. While some forms of subsurface imaging exist, an improved ability to accurately and inexpensively image subsurface objects is desirable.

SUMMARY

In general, the disclosure involves a system and a method for generating images of subsurface objects. This includes inducing an acoustic energy in a first object that extends into one or more subterranean formations from at or near a terranean surface. The first object including an infrastructure object. The acoustic energy propagates from the first object to a second object that is enclosed within the one or more subterranean formations. An array of transducers records reflected acoustic energy that propagates from the second object to the array, and the recorded, reflected acoustic energy is provided as an input to a machine learning algorithm to generate image data associated with the second object. The machine learning algorithm generates a subsurface model that includes the generated image data associated with the second object for presentation in a graphical user interface.

Implementations can optionally include one or more of the following features.

In some implementations, the first object includes an underground pipe of a particular length and diameter.

In some implementations, the array of transducers includes at least one accelerometer.

In some implementations, inducing acoustic energy in the first object includes inducing vibrations at a predetermined frequency range in the first object.

In some implementations, additional seismic data is provided as an input to the machine learning algorithm.

In some implementations, the subsurface model includes one or more faults or anomalies associated with the second object.

In some implementations, the second object is a construction infrastructure object. In some implementations, the second object is formed of at least one of plastic, wood, or ceramic.

In some implementations a condition of the second object is determined based on the subsurface model. In some implementations, when the condition of the second object is determined to be poor, an excavation location associated with the second object is determined.

In some implementations, the acoustic energy includes acoustic wave energy.

Implementations can include one or more of the following advantages. By using infrastructural (e.g., pipes, electrical infrastructure, etc.), or other anthropogenic objects as a source, there is no need for complex or frequent excavation or deployment operations to position a source. Additionally, buried objects that may not be suited for imaging via other methods (e.g., wooden objects that are difficult to detect using ground penetrating radar) can be readily detected using acoustic means with a synthetic subterranean source. The present disclosure provides flexibility in generating high quality subsurface images without installing complex subsurface acoustic sources. This also allows higher-fidelity detection of abnormal conditions, such as leaks from a water pipe, a break in a cable, sinkholes, ground movements, or illicit tunneling/constructions, among other things.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

In general, this disclosure relates to generating subsurface images of subterranean objects using partially subterranean infrastructure as a source.

DETAILED DESCRIPTION

This disclosure describes a system and method for generating images and location data of a subsurface object using existing infrastructure as a source. Submerged objects (e.g., pipes, wires, lines, etc.) often can be difficult to locate or inspect. Certain imaging technologies can provide non-obtrusive inspections of some objects. For example, ground-penetrating radar (GPR) can provide images of objects near the surface, which can be used to inspect or assess the condition of, for example, subsurface pipes and wires. GPR, however, does not yield great results when the subsurface object to be imaged is ceramic, or plastic, or otherwise does not substantially reflect radio waves. Additionally GPR can be very sensitive to soil moisture content present, further complicating imaging. Acoustic, or seismic imaging can provide a solution for imaging subsurface objects that are otherwise poorly suited for imaging using radio techniques, however acoustic sources can be difficult to install and require precise placement. This disclosure contemplates using preexisting infrastructure as a subsurface acoustic signal source in order to generate images and locations of subsurface objects.

Many infrastructure objects (e.g., pipes, cables, conduits, wells, foundation structures) are constructed of rigid materials and have a known shape and location. Additionally these infrastructure objects can have exposed portions that are above or near the surface and readily accessible. A signal generator can be affixed to the exposed portion of the infrastructure object, which induces acoustic energy, or vibrations in the object. The object with affixed signal generator can then be used as a source in performing a subsurface imaging of subsurface objects, which are not exposed.

Figure 1:
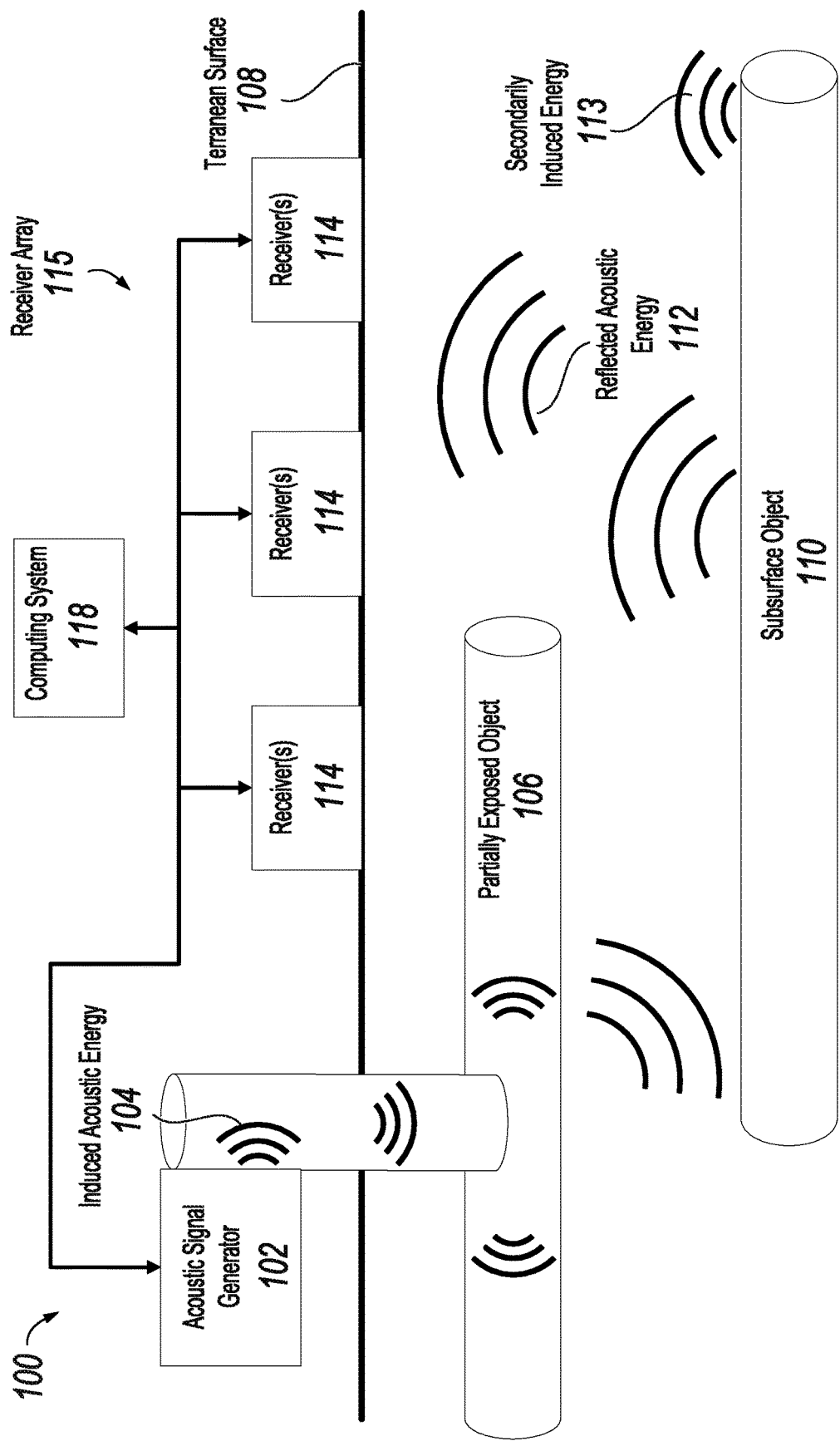
FIG. 1 depicts an example implementation of a system for generating subsurface images using a partially exposed subterranean object.

FIG. 1 depicts a system 100 for generating subsurface images using a partially exposed or surficially accessible subterranean object. An acoustic signal generator 102 is affixed to a partially exposed object 106, in order to induce acoustic energy 104 in the partially submerged object 106. An array of receivers 114 can record reflected acoustic energy 112 that reflected from a subsurface object 110. The recorded, reflected acoustic energy 112 can be provided to a computing system 118, which can then generate a subsurface image associated with the subsurface object 110.

The acoustic signal generator 102 can be a device that is configured to mount or adhere to a partially exposed object 106. For example, where the partially exposed object 106 is a pipe, the acoustic signal generator can be a vibration device configured to thread into a standard fitting on the pipe. In an alternative example, the acoustic signal generator 102 can be strapped to, or be mounted on the partially exposed object. The acoustic signal generator can include a transducer, which converts an electrical input signal (e.g., from computing system 118 as discussed in more detail below) into an acoustic signal, or vibrational signal. In some implementations the acoustic signal generator 102 can include an eccentric rotating mass motor, which induces vibrations at a frequency proportional to the speed of the motor. In some implementations, the acoustic signal generator 102 can include a percussion device such as a hammer or piston which is configured to impact the partially exposed object 106. In some implementations, the acoustic signal generator 102 is a piezoelectric ultrasonic transducer with tight coupling to the partially exposed object 106. In some implementations the acoustic signal generator 102 is a portable speaker that is capable of generating signals in relevant frequencies.

In some implementations, the acoustic signal generator 102 can generate an acoustic signal using fluid traveling through the partially exposed object 106. For example, where the partially exposed object 106 is a pipe, the acoustic signal generator 102 can control a valve, which rapidly stops flow. This can cause a pressure shockwave to travel throughout the pipe, inducing a large noise sometimes called water hammer. In these implementations, water hammer can be a suitable induced acoustic energy 104. Alternatively, pre-existing or routine water hammer in a pipe can be used as a passive source for subsurface imaging.

The acoustic signal generator 102 can induce acoustic energy 104 in the partially exposed object 106. The induced acoustic energy 104 can be selected to maximize its propagation from the partially submerged object. In some implementations, the induced acoustic energy 104 includes a swept frequency pulse, or a series of pulses at varying frequencies. In some implementations, the induced acoustic energy 104 could involve a sinusoidal or square wave at frequencies of interest, based on the object's material and geometry. In some implementations, the acoustic signal generator 102 induces acoustic energy 104 in response to inputs from the computing system 118. For example, a machine learning algorithm can determine, based on previous recorded returns or reflected acoustic energy 112 (described in more detail below) an optimal frequency to transmit into the partially exposed object 106.

The partially exposed object 106 can be an infrastructure object that has a readily accessible portion. For example, the partially exposed object 106 can be a water pipe with one or more access points above the surface, or just below the surface. In some implementations, a majority of the partially exposed object 106 is underground, below a terranean surface 108. In some implementations, the partially exposed object 106 is a construction foundation or other structural element that penetrates below the terranean surface 108. Pylons (e.g. for bridges or skyscrapers), steam vents, tunnels, or even organic matter such as trees could also be used as acoustic waveguides.

The induced acoustic energy 104 is transferred from the partially exposed object 106 into the ground. The induced acoustic energy 104 propagates through the terrain in an area around the partially exposed object 106 and can impact subsurface object 110. While illustrated as a cylindrical object, subsurface object 110 can be any subterranean object of any form for which imaging is desired. For example, subsurface object 110 can be a subterranean interface or fault, or a ceramic pipeline, ruins or other archeological features, or other object. In instances where the subsurface object 110 is not particularly suited for other detection means (e.g., GPR) the acoustic imaging techniques described herein can be of particular merit. Energy from the partially exposed object 106 can reflect off the subsurface object 110 as reflected acoustic energy 112. The reflected acoustic energy 112 can be altered as it reflects from the subsurface object 110, for example it can have a phase shift, be attenuated at particular frequencies based on the properties of the subsurface object 110. This can make the reflected acoustic energy 112 more readily distinguished from induced acoustic energy 104, which may be propagating through the same volume of the subsurface as the reflected acoustic energy 112.

In addition to reflection, the induced acoustic energy 104 can further induce secondary energy in the subsurface object 110. This secondarily induced energy 113 can propagate from the subsurface object 110 and can be further detectable by receivers 114. For example, acoustic energy impacting the subsurface object 110 can cause resonant vibrations within the subsurface object 110 that are at a harmonic frequency associated with the subsurface object 110.

A receiver array 115 can detect return acoustic energy (e.g., reflected acoustic energy 112 and secondarily induced energy 113) and convert it into electrical signals, which are transmitted to computing system 118. Multiple receivers 114 positioned at predetermined locations can form an array 115, which can provide directionality for which signals are received. In some implementations the predetermined locations are adjustable, permitting rapid reconfiguration of the receiver array 114 in response to feedback of the received energy. Beamforming techniques, such as combining artificially delayed signals from each of the receivers 114 can allow the receiver array to "listen" in a precise direction. A two-dimensional array (e.g., laid in a grid on the ground) can steer its beam along two dimensions. A one-dimensional array (e.g., a single row of receivers) can steer its beam in a single dimension.

Receivers 114 can be devices suited for sensing acoustic or seismic energy in the earth and converting it to electrical signals. Receivers 114 can be geophones, or other ground based velocimeters, accelerometers, seismometers, microphones, or any combination thereof. Although illustrated as a linear array of three receivers 114, receiver array 115 can be larger, and include multiple dimensions. Additionally, receivers 114 need not be evenly spaced. For example, the receivers 114 can be located in groups or clusters spread over a relatively large area, which can form a large synthetic aperture receiver array 115.

The receivers 114 can provide received signals to the computing system 118, which can generate an image associated with the subsurface object 110. The computing system 118 is described in greater detail below with respect to FIG. 2. In some implementations, the computing system actuates the acoustic signal generator 102. In this manner, the computing system 118 can determine feedback based on previous signals sent by the acoustic signal generator 102 to induce more optimal induced acoustic energy 104 in the partially exposed object 106, in order to improve the end result. In addition to control signals, the computing system 118 can provide timing information as well as other data to the system 100.

Figure 2:
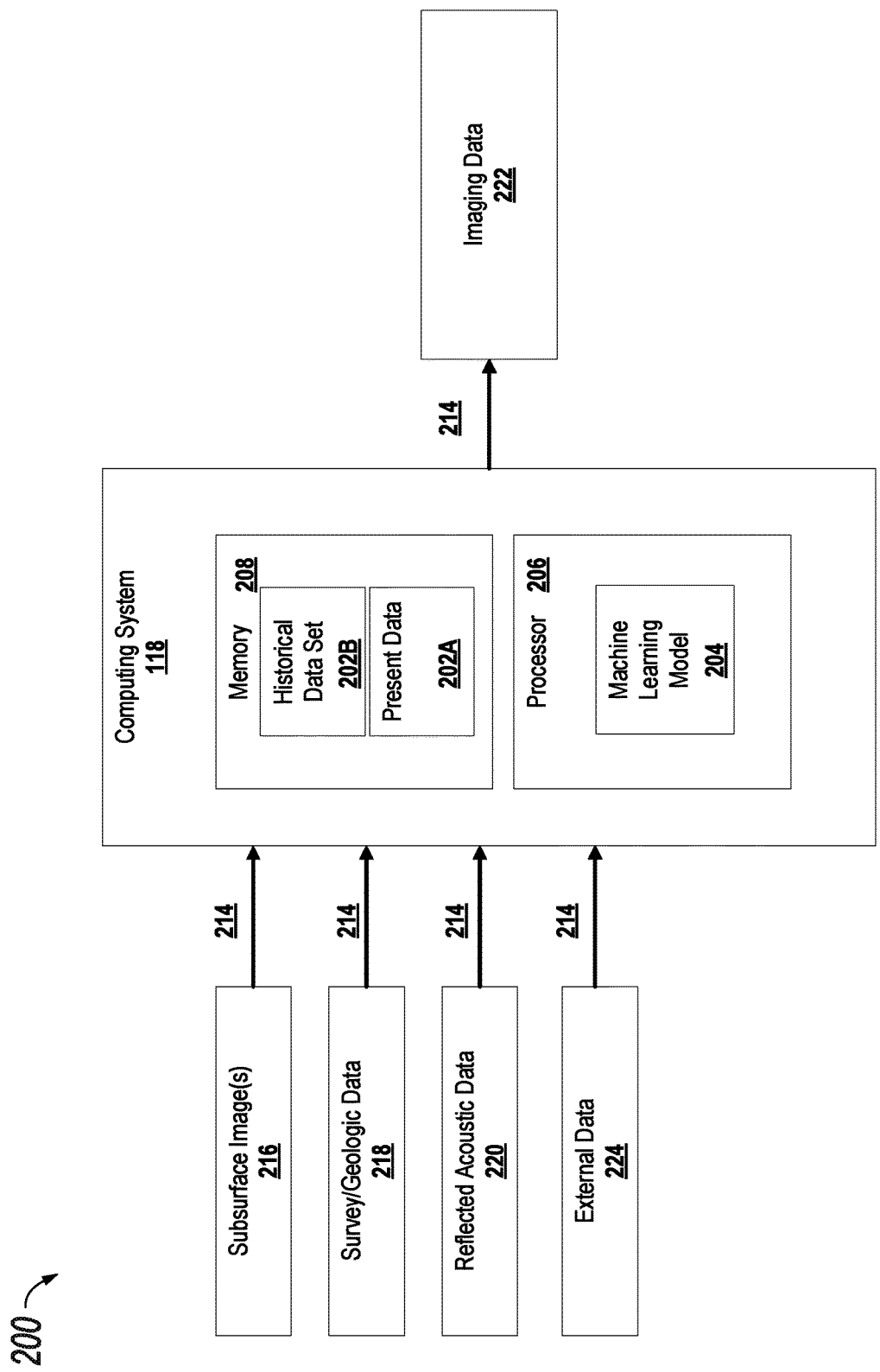
FIG. 2 depicts a block diagram of an example implementation of a computing system for generating a subsurface image.

FIG. 2 is a block diagram of an example computing system 200 for generating a subsurface image. The computing system 118 can receive data from various systems (e.g., the acoustic signal generator 102 and receiver array 115 of FIG. 1) via a communications link 214. The communication interface 214 can be but is not limited to a wired communication interface (e.g., USB, Ethernet, fiber optic) or wireless communication interface (e.g., Bluetooth, ZigBee, WiFi, infrared (IR), CDMA2000, etc.). The communication interface 214 can be used to communicate directly or indirectly, e.g., through a network, with the computing system 118.

The computing system 118 receives present data 202A from various sources via the communications link 214. Present data 202A can be data included in the most recent readings taken from a receiver array. Present data 202A can include, but is not limited to subsurface images 216, survey/geologic data 218, reflected acoustic data 220, which can be data recorded by one or more receivers (e.g., receiver 114 of FIG. 1), external data 224, which can be recorded by an additional source, such as a ground penetrating radar, or other subsurface imaging device being used in conjunction with the systems described herein. In some implementations, the present data 202A can be received in real-time. The present data 202A is then used by the machine learning model 204 operating with a processor 206 to generate a quantified output.

Subsurface images 216 can be images of a region or regions that were obtained prior to generating imaging data 222. The subsurface image 216 can be, but is not limited to, a conventionally obtained image (e.g., recorded using reflection seismology), or a previous imaging data obtained using induced acoustic energy. In some implementations, subsurface images 216 are not necessary, or required to produce imaging data 222. The subsurface images 216 can be based on seismic data, inferred data, theoretical models, geophysical models, and geological models etc.

Survey and Geologic data 218 can include data recorded from one or more surveys, or geologic determination that have been made in the past. For example, when an object is excavated or a building is constructed, surveys may be conducted prior to, and after the construction. These surveys may contain geologic data that can be used as a baseline by the machine learning model 204 in generating imaging data 222.

Reflected acoustic data 220 can be data received by one or more receivers (e.g., receiver array 115 of FIG. 1) and can represent energy that has been reflected from a subsurface object or target object that is to be imaged. Reflected acoustic data 220 can include both energy that has been reflected and was previously induced in a separate object (e.g., partially exposed object 106 of FIG. 1) as well as acoustic energy that is already present in the target object (e.g., flow noise) or was induced in the target object (e.g., resonant vibrations induced by an external source).

The computing system 118 can store in memory 208 a historical data set 202B. The historical data set can include all data that has previously been used in a particular region, or a subset of the previous data. The historical data set 202B can also include data relating to common trends seen across multiple regions or locations, or trends seen among particular locations or regions or any suitable combination thereof.

The machine learning model 204 receives the present data 202A, and the historical data 202B and generates a quantified output. For example, the machine learning model 204 can compare the reflected acoustic data 220 with the external data 224, survey data 218 and subsurface images 216 to generate a detailed image of a target object in imaging data 222. Imaging data 222 can represent a high resolution image of a subsurface object, without the need to excavate or install large subsurface sources. In some implementations, the imaging data 222 can include location, form, material, and contents of a target subsurface object.

In some implementations, the machine learning model 204 is a deep learning model that employs multiple layers of models to generate an output for a received input. A deep neural network is a deep machine learning model that includes an output layer and one or more hidden layers that each apply a non-linear transformation to a received input to generate an output. In some cases, the neural network may be a recurrent neural network. A recurrent neural network is a neural network that receives an input sequence and generates an output sequence from the input sequence. In particular, a recurrent neural network uses some or all of the internal state of the network after processing a previous input in the input sequence to generate an output from the current input in the input sequence. In some other implementations, the machine learning model 204 is a convolutional neural network. In some implementations, the machine learning model 204 is an ensemble of models that may include all or a subset of the architectures described above.

In some implementations, the machine learning model 204 can be a feedforward auto-encoder neural network. For example, the machine learning model 204 can be a three-layer auto-encoder neural network. The machine learning model 204 may include an input layer, a hidden layer, and an output layer. In some implementations, the neural network has no recurrent connections between layers. Each layer of the neural network may be fully connected to the next, e.g., there may be no pruning between the layers. The neural network may include an optimizer for training the network and computing updated layer weights, such as, but not limited to, ADAM, Adagrad, Adadelta, RMSprop, Stochastic Gradient Descent (SGD), or SGD with momentum. In some implementations, the neural network may apply a mathematical transformation, e.g., a convolutional transformation or factor analysis to input data prior to feeding the input data to the network.

In some implementations, the machine learning model 204 can be a supervised model. For example, for each input provided to the model during training, the machine learning model 204 can be instructed as to what the correct output should be. The machine learning model 204 can use batch training, e.g., training on a subset of examples before each adjustment, instead of the entire available set of examples. This may improve the efficiency of training the model and may improve the generalizability of the model. The machine learning model 204 may use folded cross-validation. For example, some fraction (the "fold") of the data available for training can be left out of training and used in a later testing phase to confirm how well the model generalizes. In some implementations, the machine learning model 204 may be an unsupervised model. For example, the model may adjust itself based on mathematical distances between examples rather than based on feedback on its performance.

The machine learning model 204 can be, for example, a deep-learning neural network or a "very" deep learning neural network. For example, the machine learning model 204 can be a convolutional neural network. The machine learning model 204 can be a recurrent network. The machine learning model 204 can have residual connections or dense connections. The machine learning model 204 can be an ensemble of all or a subset of these architectures. The model may be trained in a supervised or unsupervised manner. In some examples, the model may be trained in an adversarial manner. In some examples, the model may be trained using multiple objectives, loss functions or tasks.

In some implementations, the machine learning model 204 can generate imaging data 222 based on recorded data only. In other words, the imaging data 222 can be a new image, based on no prior collections. In some implementations, the machine learning model 204 can use reflected acoustic data 220 and survey and geologic data 218 to improve a previously existing subsurface image 216. For example, a subsurface image 216 can be re-rendered at a higher resolution, or better quality with increased information based on additional data received at the machine learning model 204 in order to create imaging data 222.

In some implementations, the machine learning model 204 can provide suggested additional data that could further improve the output of the machine learning model 204. For example, the machine learning model 204 could provide suggested frequencies for a source acoustic signal to maximize the quality of reflected acoustic data 220. In another example, the machine learning model 204 could provide recommended locations for receivers (e.g., receivers 114 of FIG. 1) to record reflected acoustic data 220.

Figure 3:
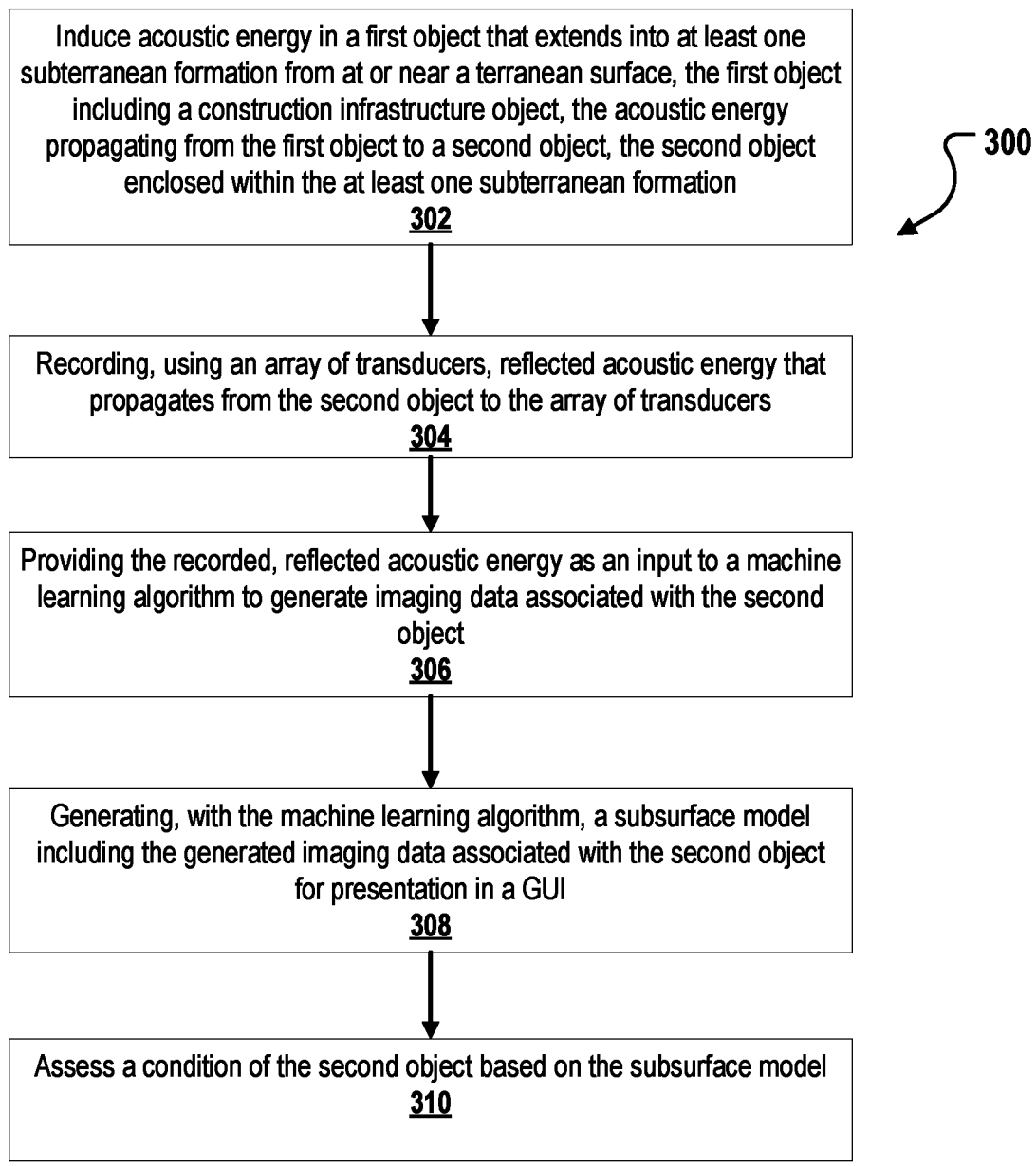
FIG. 3 is a flowchart describing an example method for generating a subsurface image.

FIG. 3 is a flowchart describing an example method for generating a subsurface image. In some implementations, the example process 300 may be performed using one or more computer-executable programs executed using one or more computing devices.

At 302, acoustic energy is induced in a first object that extends into at least one subterranean formation from at or near a terranean surface. The first object can be a construction infrastructure object and can permit the induced acoustic energy to propagate from the first object to a second, subsurface object. The second object can be fully enclosed by at least one subterranean formation. The first object can be, for example, a pipe, foundation, pylon, cable, conduit, well, or other suitable infrastructure object. In some instances, the induced acoustic energy includes a swept frequency, or a combination of frequencies, and is selected to provide for propagation from the first object and reflection on the second object.

At 304, an array of transducers records reflected acoustic energy that propagates from the second object to the array. The transducers can be geophones, or accelerometers, or other devices that can listen for and record subterranean acoustic energy. The array can be a two-dimensional array, and the recorded energy can be recorded using beamforming techniques to provide directionality to the array. In some implementations, the array is a multi-dimensional array.

At 306, the recorded, reflected acoustic energy is provided as an input to a machine learning algorithm to generate imaging data associated with the second object. In some implementations the imaging data includes a detailed image associated with the second object, and can be suitable for inspecting the second object. In some implementations, the machine learning algorithm can automatically identify anomalies or defects in the second object, and provide tags or labels with the imaging data.

At 308, the machine learning algorithm generates a subsurface model including the generating imaging data associated with the second object. The subsurface model can be presented in a graphical user interface (GUI). In some implementations the subsurface model is a three dimensional model representing the second object and/or its location relative to a terranean surface, the first object, or other feature (e.g., a geologic fault). In some implementations, the subsurface model includes a number of data layers or labels that can be toggled by the user. For example, the subsurface model can include a three dimensional model presented in a GUI, and the user can toggle anomaly tags assigned by the machine learning model indicating potential defects in the second object. In some instances, a density overlay can provide a view of the relative density of the earth surrounding the second object, or of material within the second object.

Optionally, at 310, the machine learning algorithm can assess the condition of the second object based on the subsurface model. For example, if the machine learning algorithm detects no anomalies or defects, it can assess that the second object is in a satisfactory condition. On the other hand, if a number of anomalies or defects is above a predetermined threshold, the machine learning algorithm can flag the second object for further review by a user, or identify that the second object has an unsatisfactory condition.

Figure 4:
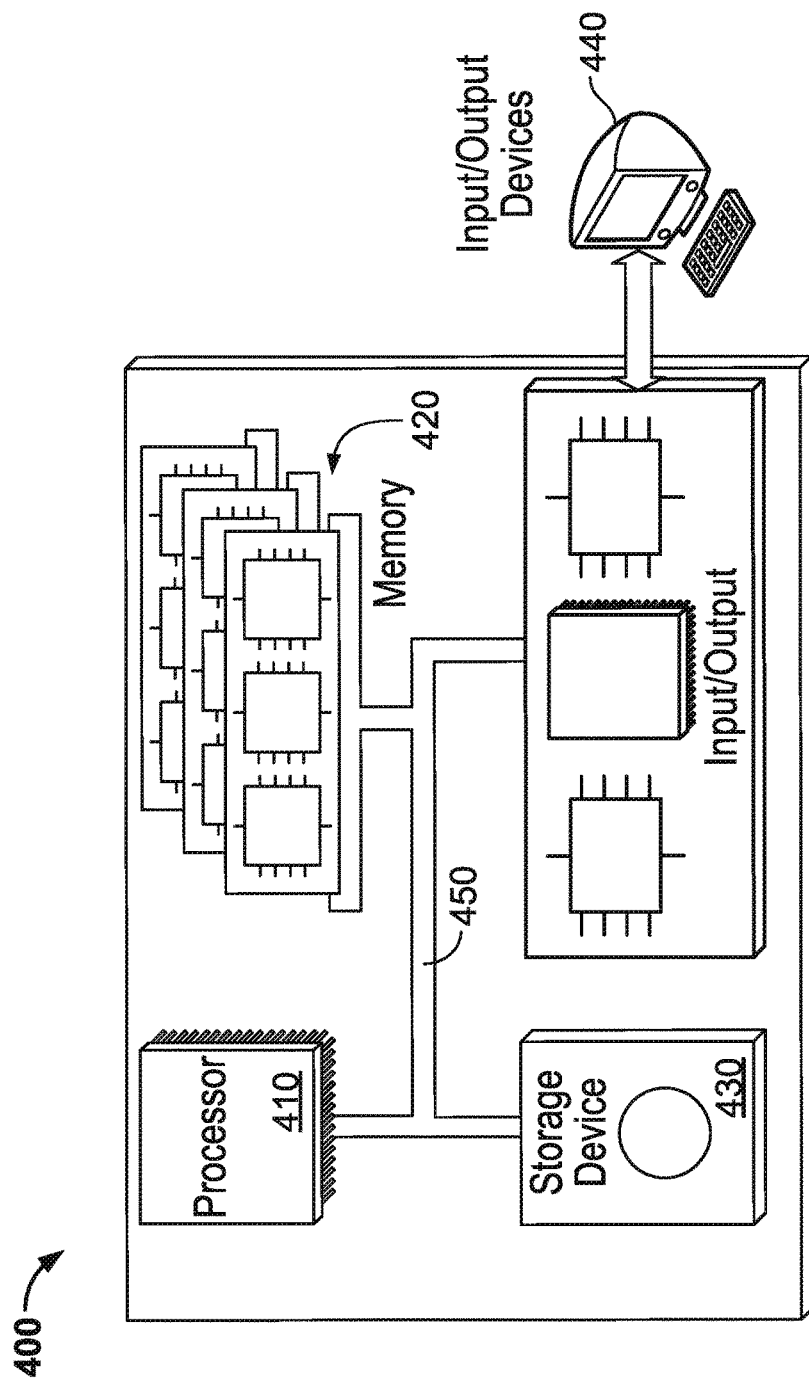
FIG. 4 depicts a computing system for generating a subsurface image.

FIG. 4 is a schematic diagram of a computer system 400. The system 400 can be used to carry out the operations described in association with any of the computer-implemented methods described previously, according to some implementations. In some implementations, computing systems and devices and the functional operations described in this specification can be implemented in digital electronic circuitry, in tangibly-embodied computer software or firmware, in computer hardware, including the structures disclosed in this specification (e.g., computing system 102) and their structural equivalents, or in combinations of one or more of them. The system 400 is intended to include various forms of digital computers, such as laptops, desktops, workstations, servers, blade servers, mainframes, and other appropriate computers. The system 400 can also include mobile devices, such as personal digital assistants, cellular telephones, smartphones, and other similar computing devices. Additionally, the system can include portable storage media, such as, Universal Serial Bus (USB) flash drives. For example, the USB flash drives may store operating systems and other applications. The USB flash drives can include input/output components, such as a wireless transducer or USB connector that may be inserted into a USB port of another computing device.

The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. The processor may be designed using any of a number of architectures. For example, the processor 410 may be a CISC (Complex Instruction Set Computers) processor, a RISC (Reduced Instruction Set Computer) processor, or a MISC (Minimal Instruction Set Computer) processor.

In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system, including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits). The machine learning model can run on Graphic Processing Units (GPUs) or custom machine learning inference accelerator hardware.

To provide for interaction with a user, the features can be implemented on a computer having a display device such as a CRT (cathode ray tube) or LCD (liquid crystal display) monitor for displaying information to the user and a keyboard and a pointing device, such as a mouse or a trackball by which the user can provide input to the computer. Additionally, such activities can be implemented via touch-screen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The foregoing description is provided in the context of one or more particular implementations. Various modifications, alterations, and permutations of the disclosed implementations can be made without departing from scope of the disclosure. Thus, the present disclosure is not intended to be limited only to the described or illustrated implementations, but is to be accorded the widest scope consistent with the principles and features disclosed herein.

The invention claimed is:

1. A method for imaging at least one subsurface object, comprising:
inducing an acoustic energy in a first object that extends into one or more subterranean formations from at, or near a terranean surface, the first object comprising an infrastructure object, the acoustic energy propagating from the first object to a second object, the second object comprising a construction infrastructure object and enclosed within the one or more subterranean formations;
recording, using an array of transducers, reflected acoustic energy that propagates from the second object to the array of transducers;
providing the recorded, reflected acoustic energy as an input to a machine learning algorithm to generate image data associated with the second object; and
generating, with the machine learning algorithm, a subsurface model that comprises the generated image data associated with the second object for presentation in a graphical user interface.

2. The method of claim 1, wherein the first object comprises an underground pipe of a previously identified length and diameter.

3. The method of claim 1, wherein the array of transducers comprises at least one accelerometer.

4. The method of claim 1, wherein inducing acoustic energy in the first object comprises inducing vibrations of a predetermined frequency range in the first object.

5. The method of claim 1, wherein additional seismic data is provided as an input to the machine learning algorithm.

6. The method of claim 1, wherein the subsurface model comprises one or more faults or anomalies associated with the second object.

7. The method of claim 1, wherein the second object is formed of at least one of plastic, wood, or ceramic.

8. The method of claim 1, further comprising determining a condition of the second object based on the subsurface model.

9. The method of claim 8, further comprising:
determining that the condition of the second object is poor; and
based on the determination, identifying an excavation location associated with the second object.

10. The method of claim 1, wherein the acoustic energy comprises acoustic wave energy.

11. A non-transitory, computer readable storage medium storing instructions that, when executed by at least one processor, cause the at least one processor to perform operations comprising:
inducing an acoustic energy in a first object that extends into one or more subterranean formations from at, or near a terranean surface, the first object comprising an infrastructure object, the acoustic energy propagating from the first object to a second object, the second object comprising a construction infrastructure object and enclosed within the one or more subterranean formations;
recording, using an array of transducers, reflected acoustic energy that propagates from the second object to the array of transducers;
providing the recorded, reflected acoustic energy as an input to a machine learning algorithm to generate image data associated with the second object; and
generating, with the machine learning algorithm, a subsurface model that comprises the generated image data associated with the second object for presentation in a graphical user interface.

12. The medium of claim 11, wherein the first object comprises an underground pipe of a previously identified length and diameter.

13. The medium of claim 11, wherein the array of transducers comprises at least one accelerometer.

14. The medium of claim 11, wherein inducing acoustic energy in the first object comprises inducing vibrations of a predetermined frequency range in the first object.

15. The medium of claim 11, wherein additional seismic data is provided as an input to the machine learning algorithm.

16. A system for generating a global subsurface model, the system comprising:
one or more processors;
one or more tangible, non-transitory media operably connectable to the one or processors and storing instructions that, when executed, cause the one or more processors to perform operations comprising:
inducing an acoustic energy in a first object that extends into one or more subterranean formations from at, or near a terranean surface, the first object comprising a construction infrastructure object, the acoustic energy propagating from the first object to a second object, the second object comprising a construction infrastructure object and enclosed within the one or more subterranean formations;
recording, using an array of transducers, reflected acoustic energy that propagates from the second object to the array of transducers;
providing the recorded, reflected acoustic energy as an input to a machine learning algorithm to generate image data associated with the second object; and
generating, with the machine learning algorithm, a subsurface model that comprises the generated image data associated with the second object for presentation in a graphical user interface.

17. The system of claim 16, wherein the first object comprises an underground pipe of a previously identified length and diameter.

18. The system of claim 16, wherein the array of transducers comprises at least one accelerometer.

19. The system of claim 16, wherein inducing acoustic energy in the first object comprises inducing vibrations of a predetermined frequency range in the first object.

20. A method for imaging at least one subsurface object, comprising:
inducing an acoustic energy in a first object that extends into one or more subterranean formations from at, or near a terranean surface, the first object comprising an infrastructure object, the acoustic energy propagating from the first object to a second object, the second object enclosed within the one or more subterranean formations;
recording, using an array of transducers, reflected acoustic energy that propagates from the second object to the array of transducers;
providing the recorded, reflected acoustic energy as an input to a machine learning algorithm to generate image data associated with the second object;

generating, with the machine learning algorithm, a subsurface model that comprises the generated image data associated with the second object for presentation in a graphical user interface;

determining that a condition of the second object is poor based on the subsurface model; and based on the determination, identifying an excavation location associated with the second object.

21. The method of claim 20, wherein the first object comprises an underground pipe of a previously identified length and diameter.

22. The method of claim 20, wherein the array of transducers comprises at least one accelerometer.

23. The method of claim 20, wherein inducing acoustic energy in the first object comprises inducing vibrations of a predetermined frequency range in the first object.

24. The method of claim 20, wherein additional seismic data is provided as an input to the machine learning algorithm.

25. The method of claim 20, wherein the subsurface model comprises one or more faults or anomalies associated with the second object.

26. The method of claim 20, wherein the second object is formed of at least one of plastic, wood, or ceramic.

27. A non-transitory, computer readable storage medium storing instructions that, when executed by at least one processor, cause the at least one processor to perform operations comprising:

inducing an acoustic energy in a first object that extends into one or more subterranean formations from at, or near a terranean surface, the first object comprising an infrastructure object, the acoustic energy propagating from the first object to a second object, the second object enclosed within the one or more subterranean formations;

recording, using an array of transducers, reflected acoustic energy that propagates from the second object to the array of transducers;

providing the recorded, reflected acoustic energy as an input to a machine learning algorithm to generate image data associated with the second object;

generating, with the machine learning algorithm, a subsurface model that comprises the generated image data associated with the second object for presentation in a graphical user interface;

determining that a condition of the second object is poor based on the subsurface model; and based on the determination, identifying an excavation location associated with the second object.

28. The medium of claim 27, wherein the first object comprises an underground pipe of a previously identified length and diameter.

29. The medium of claim 27, wherein the array of transducers comprises at least one accelerometer.

30. The medium of claim 27, wherein inducing acoustic energy in the first object comprises inducing vibrations of a predetermined frequency range in the first object.

31. The medium of claim 27, wherein additional seismic data is provided as an input to the machine learning algorithm.

32. A system for generating a global subsurface model, the system comprising:

one or more processors;

one or more tangible, non-transitory media operably connectable to the one or more processor and storing instructions that, when executed, cause the one or more processors to perform operations comprising:

inducing an acoustic energy in a first object that extends into one or more subterranean formations from at, or near a terranean surface, the first object comprising a construction infrastructure object, the acoustic energy propagating from the first object to a second object, the second object enclosed within the one or more subterranean formations;

recording, using an array of transducers, reflected acoustic energy that propagates from the second object to the array of transducers;

providing the recorded, reflected acoustic energy as an input to a machine learning algorithm to generate image data associated with the second object;

generating, with the machine learning algorithm, a subsurface model that comprises the generated image data associated with the second object for presentation in a graphical user interface;

determining that a condition of the second object is poor based on the subsurface model; and based on the determination, identifying an excavation location associated with the second object.

33. The system of claim 32, wherein the first object comprises an underground pipe of a previously identified length and diameter.

34. The system of claim 32, wherein the array of transducers comprises at least one accelerometer.

35. The system of claim 32, wherein inducing acoustic energy in the first object comprises inducing vibrations of a predetermined frequency range in the first object.

* * * * *